United States Patent
Tanaka et al.

(10) Patent No.: US 9,789,537 B2
(45) Date of Patent: Oct. 17, 2017

(54) METHOD FOR PRODUCTION OF TITANIUM INGOT USING SCRAP AND APPARATUS THEREFOR

(75) Inventors: Hisamune Tanaka, Chigasaki (JP); Takayuki Asaoka, Chigasaki (JP); Norio Yamamoto, Chigasaki (JP); Kazuhiro Taki, Chigasaki (JP); Takashi Oda, Chigasaki (JP)

(73) Assignee: TOHO TITANIUM CO., LTD., Kanagawa (JP)

( * ) Notice: Subject to any disclaimer, the term of this patent is extended or adjusted under 35 U.S.C. 154(b) by 627 days.

(21) Appl. No.: 14/126,858

(22) PCT Filed: Jun. 18, 2012

(86) PCT No.: PCT/JP2012/065550
§ 371 (c)(1),
(2), (4) Date: Dec. 23, 2013

(87) PCT Pub. No.: WO2012/176740
PCT Pub. Date: Dec. 27, 2012

(65) Prior Publication Data
US 2014/0121815 A1    May 1, 2014

(30) Foreign Application Priority Data

Jun. 18, 2011  (JP) .................................. 2011-135828
Aug. 2, 2011   (JP) .................................. 2011-169174

(51) Int. Cl.
C22B 34/10    (2006.01)
C22B 34/12    (2006.01)
(Continued)

(52) U.S. Cl.
CPC ............... B22D 7/00 (2013.01); B22D 7/005 (2013.01); B22D 7/102 (2013.01); B22D 21/005 (2013.01);
(Continued)

(58) Field of Classification Search
None
See application file for complete search history.

(56) References Cited

FOREIGN PATENT DOCUMENTS

JP        2-66129 A      3/1990
JP     2002-370257 A   12/2002
(Continued)

*Primary Examiner* — Neil N Turk
(74) *Attorney, Agent, or Firm* — Fitch, Even, Tabin & Flannery, LLP

(57) ABSTRACT

High quality titanium ingot is produced by using recovered titanium scrap as a raw material and adding additives. Scrap, each having individual information of identification and process profile information, is passed through automatic reading means to obtain the information and to store it in a data server. A calculating means calculates a combination of the scrap, titanium sponge and additives and feed rate of each of them so as to satisfy chemical composition and producing rate of a target ingot product using the individual identification pieces of information stored in the data server, during a beginning step of the ingot production, and transmits electrical signals corresponding to calculated results of the combination and the feed rates from the calculating means to a feed rate controlling means of each feed means of the titanium scrap, titanium sponge, and additives and then starting supply of them, and detecting means equipped at an extracting part of the ingot product reads actual producing rate of the ingot product, after the beginning step of the ingot production. The calculating means controls feed rate of the titanium scrap, titanium sponge, and/or additives based on the actual producing rate.

19 Claims, 6 Drawing Sheets

(51) Int. Cl.
*B22D 7/00* (2006.01)
*B22D 7/02* (2006.01)
*B22D 9/00* (2006.01)
*B22D 46/00* (2006.01)
*C22B 9/22* (2006.01)
*B22D 7/10* (2006.01)
*B22D 21/00* (2006.01)
*C22B 7/00* (2006.01)
*C22C 14/00* (2006.01)
*C22C 1/02* (2006.01)
*B22D 23/00* (2006.01)

(52) U.S. Cl.
CPC .............. *B22D 46/00* (2013.01); *C22B 7/003* (2013.01); *C22B 9/228* (2013.01); *C22B 34/12* (2013.01); *C22B 34/1218* (2013.01); *C22C 1/02* (2013.01); *C22C 14/00* (2013.01); *Y02P 10/23* (2015.11)

(56) References Cited

FOREIGN PATENT DOCUMENTS

| | | |
|---|---|---|
| JP | 2005-67850 A | 3/2005 |
| JP | 2009-245298 A | 10/2009 |
| JP | 2010-132990 A | 6/2010 |
| JP | 2010-248550 A | 11/2010 |

METHOD FOR PRODUCTION OF TITANIUM INGOT USING SCRAP AND APPARATUS THEREFOR

TECHNICAL FIELD

The present invention relates to a method for production of metal in which titanium metal scrap is employed, and in particular, relates to a recycling method for titanium metal scrap, a melting method for the scrap recycled, and an apparatus therefor.

BACKGROUND ART

Titanium metal is primarily employed in the field of aircraft, and there is a tendency for demand for titanium material to increase because of increase in demand to replace aircraft. In addition, there also is a tendency of increased demand for titanium material for consumer use. Thus, it is necessary to satisfy the demands for titanium material worldwide.

Under such circumstances, supply of rutile and ilmenite, which are ores as raw materials for the production of titanium metal, has not been sufficient, and improvement in the situation is required.

On the other hand, when focusing on scrap generated after processing of titanium metal ingots, although the material remaining after processing of titanium material of a final product has been individually traded and recycled, titanium metal scraps are merely recycled among all of the titanium metal scraps generated in the entire market. Thus, enlargement of titanium scrap recycle is required from the viewpoint of resource conservation.

An ingot produced by ingot melters (one who produces ingots from new raw material or recycled raw material and supplies ingots, hereinafter simply referred to as a "maker") is supplied to ingot users for machining or plastic deformation (one who produces half-finished product or final product by processing the ingot supplied, hereinafter simply referred to as a "user"), the ingot is processed so as to produce ingot at ingot user factory, and the scrap remained as a byproducts at the same time. This kind of scrap is recovered and returned to ingot melters again.

The titanium scraps which are recycled from ingot users to ingot melters are classified as so-called CP scrap and alloy scrap by sorting operation between CP scrap and alloy scrap, thereof is performed manually, and it is necessary to analyze alloy compositions for each scrap. Thus, there is a room for improving the sorting efficiency.

Furthermore, there are possibilities of mistakes in the manual sorting of titanium scrap and mistakes in re-melting ingots using erroneously sorted scrap as a raw material, and thus there is room for improvement from the viewpoint of guarantee of quality of the ingot.

To solve the problems, a method has been suggested in which an IC tag recording product information thereof is attached to a resin product to be recycled (See the Patent Publications 1 to 3 below).

In this method, individual information for identification of the resin in recycling materials is recorded in the IC tag. Therefore, by reading the individual information for identification of the IC tag recorded to the recycled material, properties of the recycled material can be understood, and as a result, the resin product can be efficiently reproduced (See the Patent Publication 1).

However, in a case that an ingot as a product is melted and produced, it is necessary that titanium material such as titanium sponge and additives such as titanium oxide and iron oxide be mixed in addition to the titanium scrap recycled so as to satisfy compositions of the product ingot. It is not difficult to efficiently produce ingots having high quality required by the market, merely by giving the IC tag to recycled titanium, identifying the features of the raw material that is recycled, and recycling according to the method disclosed in the Patent Publication 1.

As noted above, in order to satisfy the quality of the ingot required as a product, a system is required, in which kinds and amounts of the additives added to the titanium scrap are appropriately set and the feed rate of each additive is controlled in consideration of feeding rate of the titanium scrap, in addition to selection of the titanium scrap.

The Patent Publications are as follows.
1: Japanese Unexamined Patent Application Publication No. 2002-370257
2: Japanese Unexamined Patent Application Publication No. 2009-245298
3: Japanese Unexamined Patent Application Publication No. 2005-067850

SUMMARY OF THE INVENTION

The present invention was completed in view of the above circumstances, and an object of the invention is to provide a method for production of a titanium ingot having superior quality, in which titanium scraps recovered from the market are used and other additives are added if necessary to prepare raw material for melting.

The inventors have researched in order to solve the above problems in view of the above circumstances, and they have found that information of titanium scraps which is returned to a maker can be efficiently understood by recording individual information for identification on the titanium ingot which is to be shipped to a user at the maker side, and by inheriting information on the titanium scrap which is generated during processing of the titanium ingot in a factory of the user, and as a result, the scrap can be recycled in production of a new ingot in which chemical composition is accurately controlled, and the present invention has been completed.

Furthermore, they have also found that, by adding new information in consideration of the amount of impurities which is newly increased during processing of the titanium ingot at the ingot user, the information can be accurately understood when the titanium scrap is returned to the maker, and as a result, composition of the ingot required as a product can be accurately controlled in order to reuse the scrap.

That is, a method for production of titanium ingot according to the present invention is a method in which titanium scrap is melted as a portion of the raw materials of the titanium ingot, the method including steps of: obtaining individual information for identification by passing at least one kind of titanium scrap each having the individual information for identification through automatic reading means; transmitting the obtained individual information for identification to a data server computer and then storing therein; calculating necessary combination among the titanium scrap, titanium sponge and additives and feed rate of each of them by a calculating means so as to satisfy chemical composition and producing rate of a target ingot product using the individual identification information stored in the data server, during a beginning step of the ingot production; transmitting electrical signals corresponding to calculated results of the combination and the feed rates from the calculating means to a feed rate controlling means of each feed means of the titanium scrap, titanium sponge, and/or additives and then starting supply thereof; and reading actual producing rate of the ingot product by a detecting means equipped at an extracting part of the ingot product, after the beginning step of the ingot production; in which the calculating means controls feed rate of the titanium scrap, titanium sponge, and/or additives based on the actual producing rate.

Furthermore, a method for production of titanium ingot according to the present invention is a method in which titanium scrap is melted as a partial portion of raw materials of the titanium ingot, in which individual information for identification and processing profile information are given to the titanium scrap, the individual information for identification consisting of information selected from its chemical composition, weight, and other inherent information of the titanium scrap, and the processing profile information consisting of kind of processing already performed to the titanium scrap and additive information of the processing, the method including steps of obtaining the individual identification information and the processing profile information by passing at least one kind of each titanium scrap through automatic reading means; transmitting the obtained individual identification information and process profile information to a data server computer and then storing therein; correcting the information of chemical composition in the individual information for identification by calculating means depending on variance of chemical composition of the titanium scrap which is assumed by the process profile information; calculating necessary combination among the titanium scrap, titanium sponge and additives and feed rate of each of them by the calculating means so as to satisfy chemical composition and producing rate of a target ingot product using the individual information for identification corrected and stored in the data server computer, during a beginning step of the ingot production; transmitting electrical signals corresponding to calculated results of the combination and the feed rates from the calculating means to a feed rate controlling means of each feed means of the titanium scrap, titanium sponge, and/or additives and then starting supply of them; and reading actual producing rate of the ingot product by a detecting means equipped at an extracting part of the ingot product, after the beginning step of the ingot production; in which the calculating means controls feed rate of the titanium scrap, titanium sponge, and/or additives based on the actual producing rate.

In the method for production of titanium ingot according to the present invention, the individual information for identification is recorded as an engraved mark or a two-dimensional figure that are formed directly on the scrap surface or an IC chip which is attached on the scrap.

In the method for production of titanium ingot according to the present invention, the individual information for identification and the process profile information are recorded as an engraved mark or a two-dimensional figure that are formed directly on the scrap surface or an IC chip which is attached on the scrap.

In the method for production of titanium ingot according to the present invention, the two-dimensional figure is an image pattern that is selected from digital code, QR code (trademark), or barcode or a character.

In the method for producing titanium ingot according to the present invention, the individual information for identification is information selected from chemical composition, weight, and other information that is inherent to the scrap.

In the method for production of titanium ingot according to the present invention, the individual information for identification is a source of the scrap formed on an original ingot during a producing process of the ingot.

In the method for production of titanium ingot according to the present invention, the individual information for identification is a piece of information that was recorded on the scrap after processing of an original ingot that is a source of the scrap.

In the method for production of titanium ingot according to the present invention, each of multiple kinds of titanium scraps having mutually different individual information for identification are stored in a raw material storage and the individual information for identification are stored in the data server computer, and necessary kinds of titanium scrap, which is calculated by the calculating means via the data server computer, is automatically selected and conveyed from the raw material storage to the raw material feed means.

In the method for production of titanium ingot according to the present invention, the additive is an elemental metal selected from Ti, Fe, Al, V, Sn, and Si, or an alloy or oxide containing one or more selected from Ti, Fe, Al, V, Sn, Si, O and N.

In the method for production of titanium ingot according to the present invention, the titanium scrap that has the individual information for identification is melted as it is.

In the method for production of titanium ingot according to the present invention, the titanium scrap is pure titanium material or titanium alloy material.

An apparatus for production of titanium ingot according to the present invention is an apparatus in which titanium scrap is melted as a portion of raw materials of the titanium ingot, the apparatus has an automatic reading means obtaining the individual information for identification given to one kind of titanium scrap at least; a data server storing the obtained individual information for identification; a calculating means calculating necessary combination among the titanium scrap, titanium sponge and additives and feed rate of each of them so as to satisfy chemical composition and producing rate of a target ingot product using the individual identification information stored in the data server computer, during a beginning step of the ingot production; a feed means feeding the titanium scrap, titanium sponge, and/or additives; a feed rate controlling means actuating each of the feed means of the titanium scrap, titanium sponge, and/or additives according to electrical signals corresponding to calculated results of the combination and the feed rates; and a detecting means reading actual producing rate of the ingot product and equipped at an extracting part of the ingot product, after the beginning step of the ingot production, in which the calculating means controls feed rate of the titanium scrap, titanium sponge, and/or additives based on the actual producing rate.

An apparatus for production of titanium ingot according to the present invention is an apparatus in which titanium scrap is melted as a portion of raw materials of the titanium ingot, the apparatus has an automatic reading means obtaining individual information for identification and process profile information given to one kind of titanium scrap at least, the individual information for identification consisting of information selected from its chemical composition, weight, and other inherent information of the titanium scrap, and the processing profile information consisting of kind and times of processing already performed to the titanium scrap; a data server storing the obtained individual information for identification and process profile information; a calculating means correcting information of chemical composition in the individual information for identification depending on variations of chemical composition of the titanium scrap which is assumed by the process profile information; and calculating necessary combination of the titanium scrap, titanium sponge and additives and feed rate of each of them so as to satisfy chemical composition and production rate of a target ingot using the individual information for identification stored in the data server, during a beginning step of the ingot production; feed systems of the titanium scrap, titanium sponge, and/or additives; a feed rate control means actuating each of the feed systems of the titanium scrap, titanium sponge, and/or additives according to electrical signals corresponding to calculated results of the combination and the feed rates; and a detecting means of actual production rate of the ingot and equipped at an extracting part of the ingot, after the beginning step of the ingot production; in which the calculating means controls feed rate of the titanium scrap, titanium sponge, and/or additives based on the actual producing rate.

By the present invention, since the individual information for identification is given to the scrap recovered, the composition can be recognized without analyzing the composition beforehand. Therefore, it can be reused as the raw material of the ingot as it is, and as a result, production cost of the ingot can be reduced. Furthermore, by adding the process profile information of the process performed to the scrap, even in a case that the composition varies from the original composition during the process, the variation can be assumed from the individual information for identification.

EMBODIMENT OF THE INVENTION

Hereinafter the embodiment of the invention is explained in detail.

Figure 1:
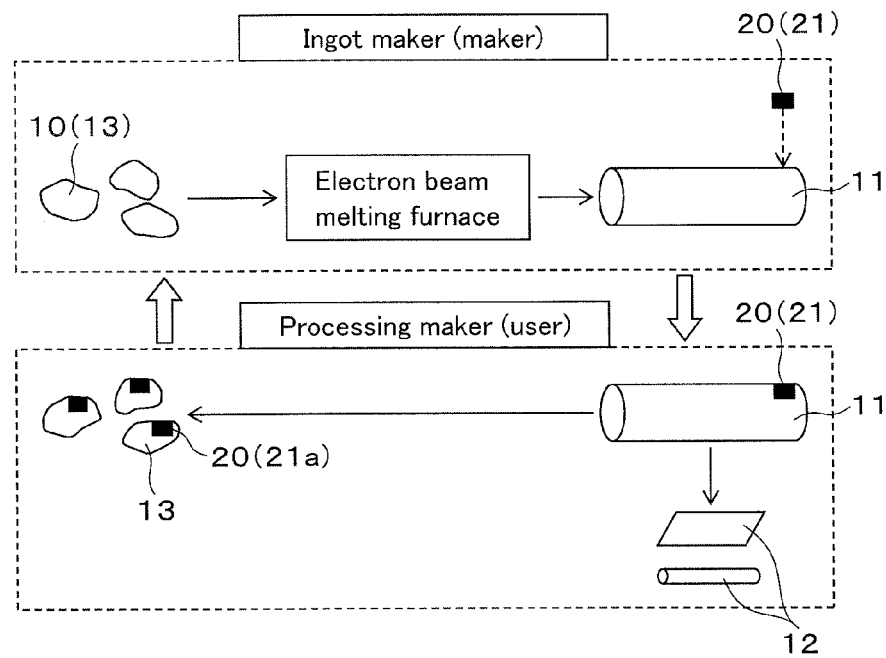
FIG. 1 is a diagram showing a flowchart of a recycling system of the present invention.

I. Case in which Composition of Original Ingot of Scrap is Carried Over to the Chemical Composition of Scrap Recycled from User I-1. Ingot Producing Process in Maker and Scrap Recovering Process from User FIG. 1 shows a desirable example of an overall flow chart to perform the present invention. First, in an ingot melters, an ingot 11 is produced by a conventional melting furnace such as an electron beam melting furnace using a new raw material 11 or a recycled raw material 13 as mentioned below. In the present invention, individual information for identification 21 concerning the ingot is given to the titanium ingot 11 produced in the maker.

The individual information for identification 21 mentioned here is not limited in particular as long as the information regarding the ingot 11, such as chemical composition, weight, lot number, shipping date, accession date of the ingot 11 or the like, and it means information which becomes necessary when the ingot 11 becomes scrap 13 and the scrap is used as raw material later.

Figure 2:
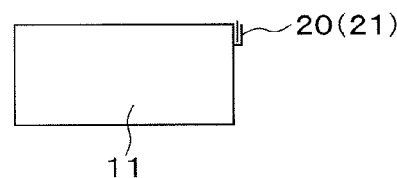
FIG. 2 is a diagram showing an ingot to which the individual information for identification of the present invention is given.

Furthermore, "the individual information for identification 21 is given to the titanium ingot 11" mentioned here practically means that an IC tag 20 in which the individual information for identification 21 is recorded, or an engraved mark information which can be optically recognized is given to the titanium ingot 11, as shown in FIG. 2.

In the case in which the IC tag 20 in which the individual information for identification 21 is recorded is given to the titanium ingot 11, it is desirable that a piece of information required to identify the ingot 11 such as chemical composition, weight, lot number, shipping date, accession date or the like of the ingot 11 be recorded in the IC tag 20 which is to be given to the titanium ingot. Then, the IC tag 20 in which the individual identification information 21 is recorded is attached to the titanium ingot 11 as shown in FIG. 2.

No special specifications are necessary for the IC tag 20, and a commercially available one can be used. However, an IC tag is designed for being attached desirably to the metal. It should be cared when using an ordinary IC tag that is not designed for attachment to metal, since there may be interference in sending and receiving of radio waves between the tag and a reading device.

Furthermore, as the individual information for identification 21, an engraved mark can be directly formed on the titanium ingot 11 produced. As the engraved marking information, information such as chemical composition, weight, lot number, shipping date, accession date or the like required for using the titanium scrap as raw materials in melting can be mentioned, and by engraving as information itself, the engraved marking can be optically readable, and as a result, the individual information for identification 21 of the ingot can be obtained.

As the engraved marking, other than characters, a pattern information such as QR code (trademark) or barcode can be recorded. By recording such information, it can be handled in highly confidentially compared to character information.

Furthermore, it is also possible that the individual information for identification 21 can be engraved on the ingot surface by a method called digital mark. This information consists of convex and concave patterns engraved on the ingot surface, and it is more confidential recording method than the QR code (trademark) and barcode as well as the character information mentioned above.

To form the engraved marking, in addition to an ordinary punching method, an engraved marking method using laser can be employed. In the laser method, the individual information for identification 21 can be given to the ingot 11 more accurately than the punching method.

Again as shown in FIG. 1, the ingot 11 on which the individual information for identification 21 is given by the above-mentioned method, is sold to ingot users. The ingot 11 sold to the ingot users is formed by hot-forging or rolling, and it is shipped as a product 12, such as a plate material, bar material, or tube material.

On the other hand, during the hot-forging process and rolling process mentioned above, scraps 13 that are edge materials having various kinds of shapes may be generated in more than a small amount in many cases. In the present invention, the scrap 13 is considered to be recycled in the maker again.

It is desirable that an individual information for identification 21a, which is inherited from the individual information for identification 21 given to the titanium ingot 11, which is the source of the scrap 13, is given on the recycled scrap 13.

As a method to give the individual information for identification 21a to the scrap 13, a method similar to the method in which the individual information for identification 21 is given to the titanium ingot 11 in the maker side can be employed at the user side.

Figure 3:
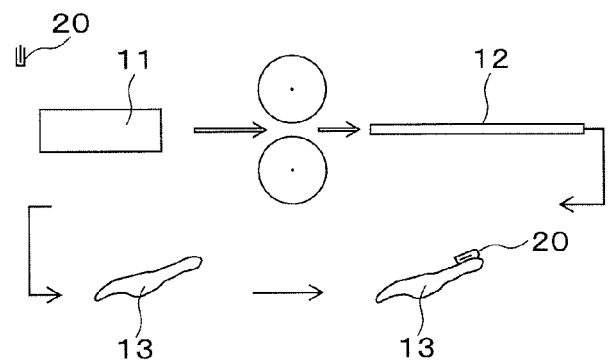
FIG. 3 is a diagram showing an inheritance of the individual information for identification in the present invention.

As a method to inherit the individual information for identification, first, in the case in which the individual information for identification 21 is stored in the IC tag 20, as shown in FIG. 3, the IC tag 20 is once detached before processing, and after the product 12 and the scrap 13 are generated after the processing, the IC tag 20 is attached again on the scrap 13.

Figure 4:
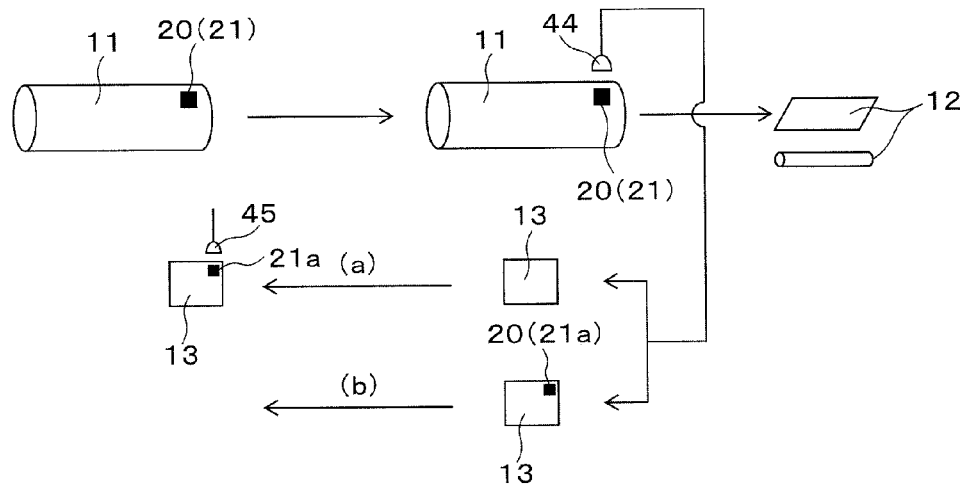
FIG. 4 is a diagram showing an inheritance of the individual information for identification in the present invention.

Alternatively, when the ingot is purchased and accepted by the user, as shown in FIG. 4, the individual information for identification 21 given to the ingot 11 is analyzed by a reading device 44 and is stored in a data server. The individual information for identification 21a stored in the data server can be recorded in another IC tag by a writing device 45 and the IC tag can be newly given to the scrap as shown by a route in FIG. 4A.

Second, in the case in which the individual information for identification 21 is the pattern information which is an engraved marking directly formed on the titanium ingot surface 11, as shown by a route in FIG. 4B, by forming the individual information for identification 21 given to the titanium ingot 11 in the maker side so that the individual information for identification 21 remains until the step of titanium scrap 13, the individual information for identification 21 of the titanium ingot 11 can be inherited by the titanium scrap 13.

In order for the individual information for identification 21 to remain in the scrap 13, it is desirable that the individual information for identification 21, consisting of a pattern engraved in the titanium 11, be formed at as many portions as possible in the maker side. Alternatively, in a case in which way of use and processing method of the ingot is obvious after supplied to the user, the marking can be given to a position where it should be scrap after processing.

Furthermore, in a case in which engraved marking should be disappeared by a processing method such as heat treatment or deforming process, the individual identification information 21 engraved is readable by the user beforehand and stored in a server, and the individual identification information 21a can be engraved as a pattern information again after the scrap 13 is generated.

As explained above, by giving and inheriting the individual identification information in either or both of the ingot producer and the ingot user, property and condition of the titanium scrap 13 recycled to the ingot maker is clear at the time of recovery, and when the ingot users melt ingot by using the scrap again as a raw material, analysis of composition need not be performed, and the production process can be efficiently promoted.

I-2. Recycling Process of Scrap in the Maker Side

First Embodiment

Figure 5A:
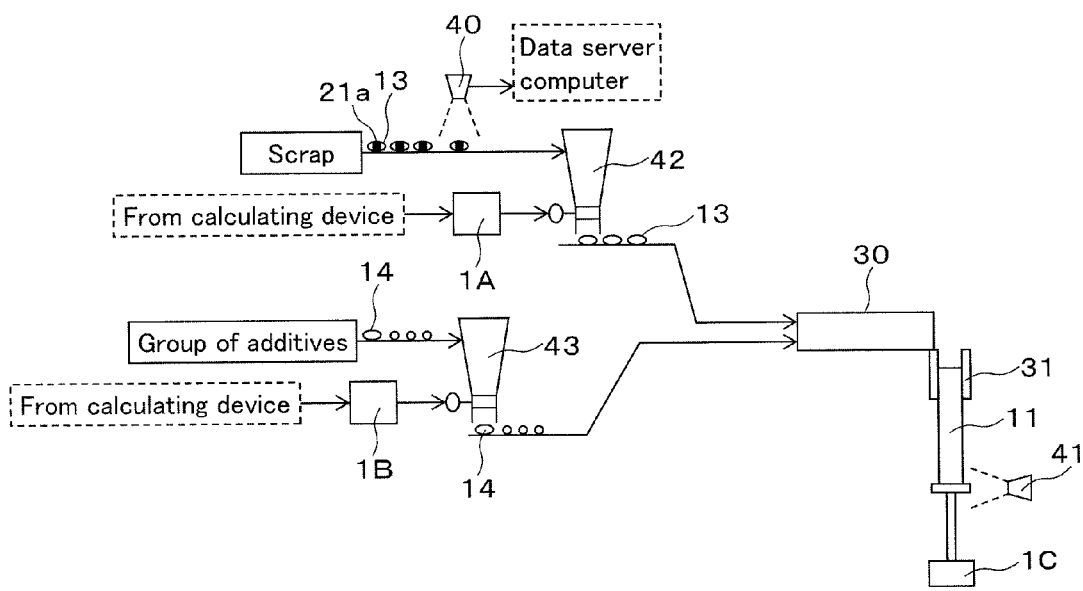
FIG. 5 is a diagram showing the first embodiment of a scrap recycling system of the present invention.
Figure 5B:
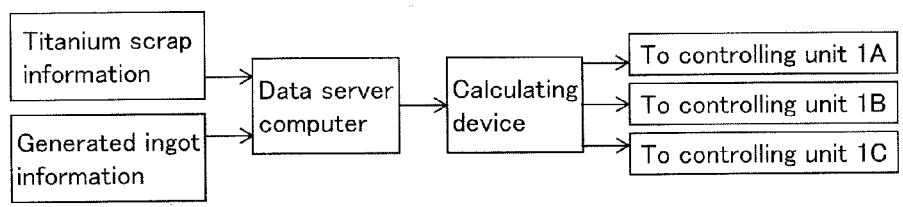

FIG. 5 shows a desirable example of process after the titanium scrap 13, which is processed beforehand, as mentioned above, is recycled to the ingot maker. That is, as shown in FIG. 5A, the titanium scrap 13 to which individual information for identification 21a is given is conveyed on a conveying line, and the individual information for identification 21a given to the titanium scrap 13 is read by an automatic reading device 40 arranged at the middle of the conveying line.

The individual information for identification 21a, which is scanned by the automatic reading device 40, is then transmitted to a data server computer. A database of chemical composition or the like which is concerned with the individual information for identification is constructed in the data server computer, and by verifying the individual information for identification 21a read and the database, information required such as chemical composition or the like of the titanium scrap can be read out.

Next, information read out is transmitted to a calculating device. The calculating device can calculate and determine feed rate of the scrap required, and also kinds and feed rate of additives 14, if necessary, to satisfy information of the target ingot to be produced (chemical composition and producing rate) which is beforehand input.

As the additive 14, multiple additives are prepared, such as an additive containing alloy composition such as Fe, Al, O, and N in high concentration, or an additive not containing an alloy composition such as titanium sponge. Each of these is separately supplied according to a result of calculation by the calculating device.

The information of feed rate of the titanium scrap 13, which has been calculated by the calculating device, is transmitted from the calculating device to a controlling device 1A controlling feed rate of the titanium scrap 13 filled in a feed hopper 42 for the titanium scrap 13. By controlling the feed hopper 42 by the controlling device 1A, the scrap 13 is supplied at a rate corresponding to a result of calculation. Similarly, information of kinds and feed rate of additives 14 such as the material containing alloy composition or titanium sponge is transmitted to a controlling device 1B, by controlling a feed hopper 43 by the controlling device 1B, the additive or additives 14 are supplied at a rate corresponding to a result of calculation.

In this way, the titanium scrap 13 and the additive or additives 14 are supplied to a hearth 30, molten metal melted therein is poured in a mold 31, and the ingot 11 is produced by cooling and solidifying the molten metal. Furthermore, the information of producing rate of the ingot input beforehand is transmitted to a controlling device 1C controlling extracting rate of the titanium ingot 11 generated, and the ingot 11 is actually extracted at the extracting rate.

In FIG. 5, a feeding system for additive 14 (additive 14, feed hopper 43, and controlling device 1B) is described representatively in one line; however, the feed system can be multiply arranged so as to supply multiple additives separately, if necessary.

Furthermore, the scrap can be supplied as it is without any treatment in the case in which the individual information for identification 21a is directly formed as an engraved marking on the scrap 13; however, if the individual information for identification 21a is given by attaching the IC tag 20, the IC tag 20 should be appropriately removed from the scrap 13 in a removing process between the process in which the tag is scanned by the automatic reading device 40 and the process in which the scrap is filled in the feeding hopper 42.

The kinds and feeding rates of the raw material required are calculated as follows by the calculating device. For example, in a case in which information of a target ingot (subscript: I), which should be input beforehand, is as follows:

Titanium concentration: $C_I^{Ti}$ (constant)
Oxygen concentration: $C_I^{O}$ (constant)
Nitrogen concentration: $C_I^{N}$ (constant)
Producing rate: $V_I$ (constant)

and information of a scrap (subscript: S) which is read is as follows:

Titanium concentration: $C_S^{Ti}$ (constant)
Oxygen concentration: $C_S^{O}$ (constant)
Nitrogen concentration: $C_S^{N}$ (constant)
Feed rate: $V_S$ (constant)

and information of additive of oxygen (subscript: A1, for example, titanium oxide) is as follows:

Titanium concentration: $C_{A1}^{Ti}$ (constant)
Oxygen concentration: $C_{A1}^{O}$ (constant)
Feed rate: $V_{A1}$ (constant)

and information of additive of nitrogen (subscript: A2, for example, titanium nitride) is as follows:

Titanium concentration: $C_{A2}^{Ti}$ (constant)
Nitrogen concentration: $C_{A2}^{N}$ (constant)
Feed rate: $V_{A2}$ (constant)

and information of titanium sponge (subscript: Ti) is as follows:

Titanium concentration: $C_{Ti}^{Ti}$ (=100%, constant)
Feed rate: $V_{Ti}$ (constant), then, the following formulas apply.

$$V_{Ti} \cdot C_{Ti}^{Ti} + V_{A1} \cdot C_{A1}^{Ti} + V_{A2} \cdot C_{A2}^{Ti} + V_S \cdot C_S^{Ti} = V_I \cdot C_I^{Ti}$$ (equation regarding titanium weight)

$$V_{A1} \cdot C_{A1}^{O} + V_S \cdot C_S^{O} = V_I \cdot C_I^{O}$$ (equation regarding oxygen weight)

$$V_{A2} \cdot C_{A2}^{N} + V_S \cdot C_S^{N} = V_I \cdot C_I^{N}$$ (equation regarding nitrogen weight)

Since the producing rate $V_I$ and the titanium concentration $C_I^{Ti}$ of the target ingot, and the concentrations ($C_S^{Ti}$, $C_S^{O}$, $C_S^{N}$) in the scrap and the concentrations ($C_{A1}^{Ti}$, $C_{A1}^{O}$, $C_{A2}^{Ti}$, $C_{A2}^{N}$) in the additives are already known, by solving the equalities as simultaneous equations, feeding rate of the scrap ($V_S$) and additives ($V_{A1}$, $V_{A2}$) can be determined appropriately.

When solving the equations, there may be a case in which a solution cannot be determined in one way depending on combination of materials. In such a case, feeding rate of the titanium scrap 13 can be determined in priority to the others, or feeding rate of the additive 14 can be determined in priority to the others. By selecting between these cases, a solution can be arbitrary determined in one way. This selection can be appropriately performed depending on the status of the stock of raw materials.

By installing the controlling logic mentioned above in the calculating device, feeding rate of each additive can be controlled in consideration of the feeding rate of titanium scrap in the melting furnace.

Reference numeral 41 indicates a measuring device for the generating rate of the ingot 11. During the ingot production process by the above-mentioned control, it measures the actual ingot producing rate in which accidental error of raw material supply or variation due to evaporation of molten metal or the like are considered, feeds back this measured result to the calculating device, and thus contributes to controlling of the feeding rate of the raw material and extracting rate of the ingot 11.

By constructing the system as described above, an ingot having target composition can be efficiently produced.

Second Embodiment

Figure 6A:
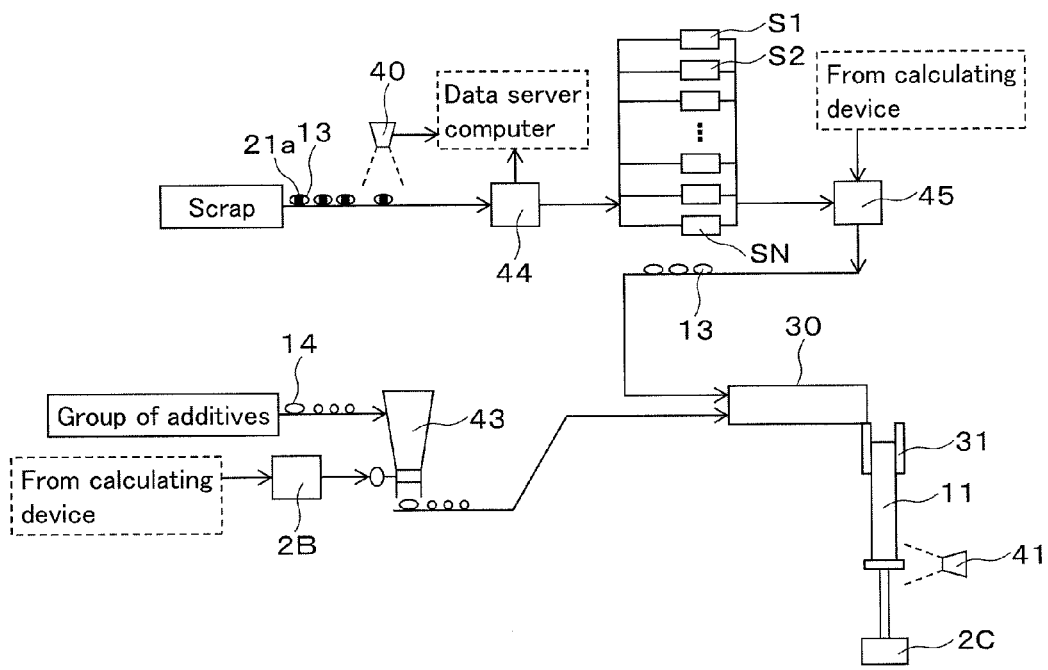
FIG. 6 is a diagram showing the second embodiment of a scrap recycling system of the present invention.
Figure 6B:
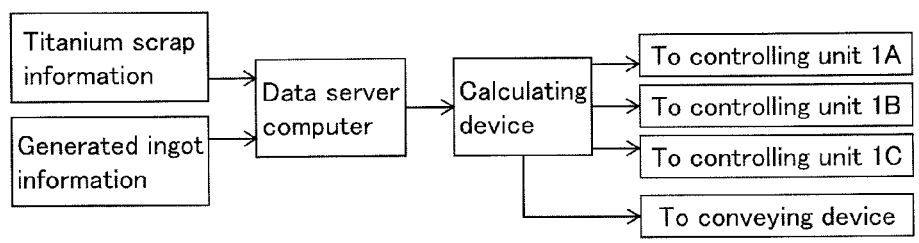

FIG. 6 shows another desirable embodiment of the present invention.

In this embodiment, different from the case of the first embodiment, the titanium scrap 13 in which the individual information for identification 21a is read at the automatic reading device 40 is once stored in a raw material storage S via a conveying device 44. This process is repeated for each scrap of multiple kinds, and each of them is separately stored in storage S1, S2, . . . SN.

At this time, in addition to storing each scrap in the corresponding storage, individual information for identification 21a which is read by the automatic reading device 40 is transmitted to the data server computer, and the information of number of storage (S1, S2, . . . SN) in which each scrap is stored is also stored in the data server computer by being added to the individual information for identification 21a.

Subsequently, similar to the first embodiment, composition and producing rate of a target ingot are input, and according to this, kinds and feed rate of the scrap, and kinds and feed rate of the additives are calculated by the calculating device. The result of calculation is transmitted to a conveying device 45, then desirable titanium scrap is automatically selected from the storage appropriately, and specific titanium scrap and additive(s) can be supplied to the hearth.

Also in this embodiment, similar to the first embodiment, there is a case in which solutions of simultaneous equations of chemical composition concentration and feed rate are not determined in one way; however, also in this case, by determining kind and feed rate of a scrap to be used preferentially among the scraps stored in the storage, variable number regarding other scraps and additives can be determined.

In the second embodiment, compared to the first embodiment, more variable ingots having wide specifications can be produced.

As the titanium scrap used in the present invention, titanium cut chips, titanium chips, or titanium crop can be appropriately used. The titanium crop mentioned here indicates titanium blocks having thickness to some extent, which is generated in a rolling process of titanium ingot, that is, cuboid titanium scrap. The titanium crop having such a shape can be appropriately melted by using an electron beam melting furnace having a conveying device of cuboid shape.

Furthermore, it is desirable that an elemental metal selected from Ti, Fe, Al, V, Sn, Si or an alloy or oxide containing one or more selected from Ti, Fe, Al, V, Sn, Si, O, or N be used as the additive of the present invention.

Practically, the additive of the invention includes not only an oxygen source to be added to pure titanium such as titanium oxide and iron oxide, but also titanium sponge. The titanium sponge can be an effective additive in a case in which there is too little titanium scrap to satisfy the required production amount of titanium ingot, or in a case in which it is necessary to satisfy the required properties of titanium ingot produced.

By appropriately selecting and combining these elements, titanium ingots having wide specifications can be produced.

In the present invention, it is desirable that the IC tag to record the individual identification information given to the titanium scrap be as fine as possible. As a result, even in a case in which the titanium scrap is melted without removing the IC tag beforehand, contamination of the titanium ingot produced can be reduced to a minimal level.

If quality and properties required for the ingot are stringent, by recording the individual information for identification in the titanium scrap itself by a method such as laser engraving, contamination accompanied by melting the IC tag can be avoided.

II. Case in which Composition of Original Ingot is not Inherited in the Chemical Composition of Scrap Recycled from a User, Because the Scrap is Affected by Processing Treatment Process

Figure 7:
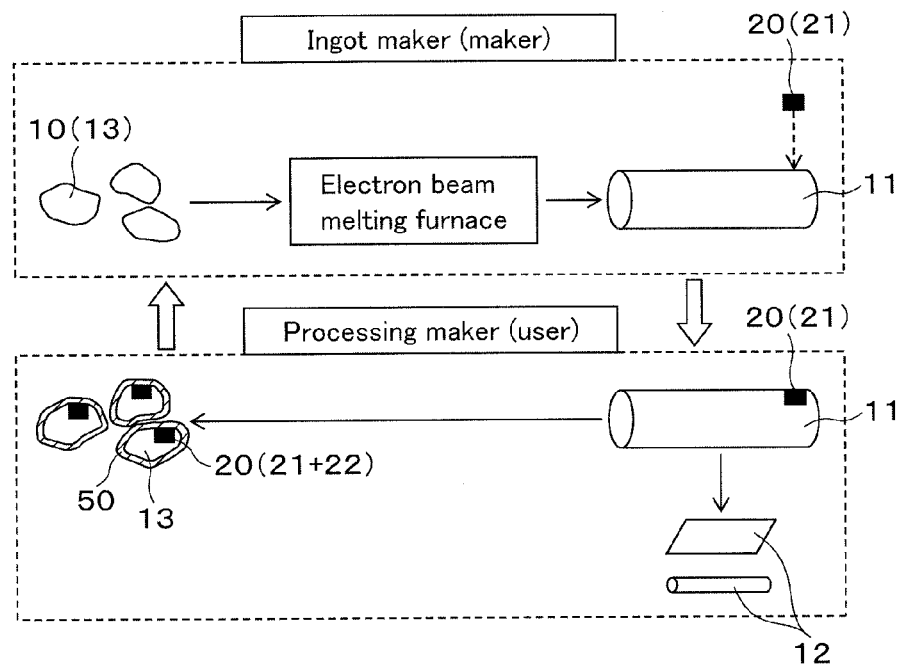
FIG. 7 is a diagram showing a flowchart of recycling system of the present invention.

II-1. Ingot Producing Process at Ingot Melters and Scrap Recovering Process from Ingot Users FIG. 7 corresponds to FIG. 1, there is a difference in that an oxide layer or nitride layer is formed on the scrap surface recycled from the processing maker.

That is, during a treatment of ingot under high temperature and in an atmosphere such as the hot forging process, hot rolling process, or gas cutting process by melting an object, since the processed ingots contacts the atmosphere while being heated, and an oxide or nitride layer 50 is formed on the surface. By this phenomenon, overall composition of the scrap 13 is varied from one of the original ingot 11. Therefore, to assume variance of composition of scrap 13 after the process, the process profile information 22 is added to the individual information for identification 21, as a piece of information showing how the scrap is to be treated.

The process profile information 22 is information consisting of kind of treatment such as hot-forging, hot-rolling, and gas cutting, treatment temperature, time to spend for the process, and number of times for the process, for example.

As a method to give the individual information for identification 21 and the process profile information 22 to the scrap 13, a method similar to the method in which the individual information for identification 21 is given to the titanium ingot 11 at the ingot melters can be employed at the ingot users.

Figure 8:
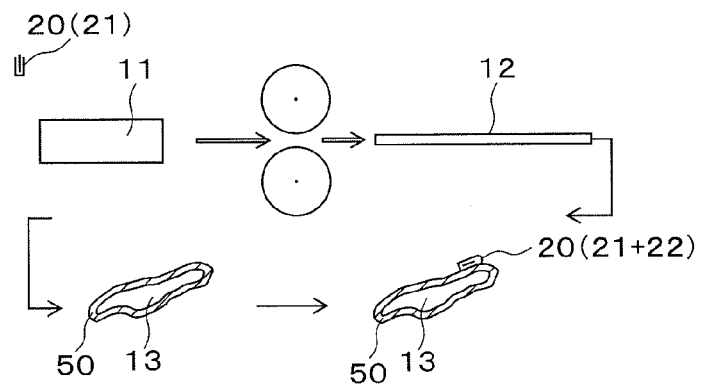
FIG. 8 is a diagram showing an inheritance of the individual identification information and giving of the process profile information in the present invention.

As a method to inherit the individual information for identification 21 and to give the process profile information 22, first, in the case in which the individual information for identification 21 is stored in the IC tag 20, as shown in FIG. 8, the IC tag 20 is once detached before processing, and after the product 12 and the scrap 13 are generated after the processing, the IC tag 20 in which the process profile information 22 is merged to the individual information for identification 21, is attached again on the scrap 13.

Figure 9:
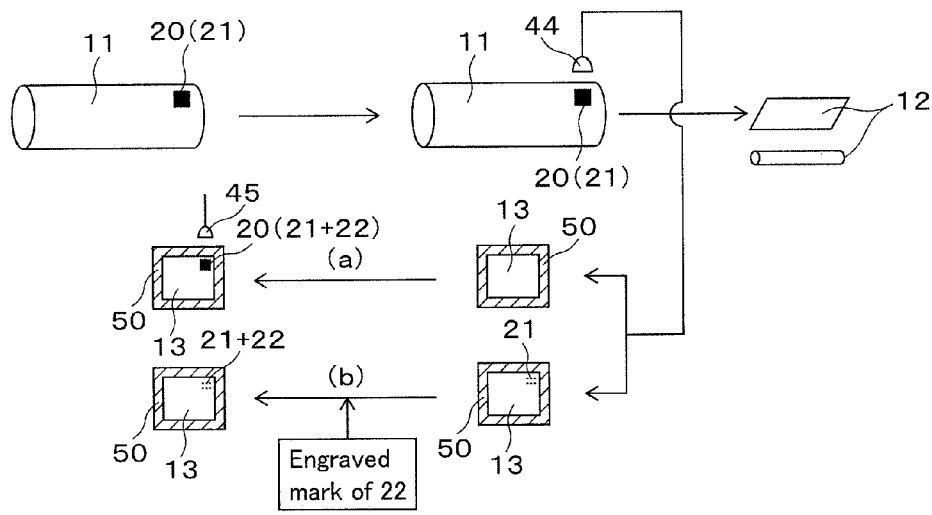
FIG. 9 is a diagram showing an inheritance of the individual information for identification and giving of the process profile information in the present invention.

Alternatively, when the ingot is bought and accepted in the user, as shown in FIG. 9, the individual information for identification 21 given to the ingot 11 is read by a reading device 44 and stored in a data server. After the scrap 13 is generated, the individual information for identification 21 stored in the data server and the process profile information 22 of performed processing can be recorded in another IC tag by a writing device 45, and the IC tag can be newly given to the scrap 13 as shown by a route in FIG. 9A.

Second, in the case in which the individual information for identification 21 is the pattern information which is an engraved marking directly formed on the titanium ingot surface 11, as shown by a route in FIG. 9B, by forming the individual information for identification 21 given to the titanium ingot 11 in the maker side so that the individual information for identification 21 remains until the step of titanium scrap 13, the individual identification information 21 of the titanium ingot 11 can be inherited by the titanium scrap 13. In this case, furthermore as shown in FIG. 9B, the processing profile information 22 is added in addition to the individual information for identification 21 by engraving, after the process is completed.

Furthermore, in a case in which an engraved mark should disappear by a process profile information such as heat treatment or deforming, the individual information for identification 21 engraved is scanned by the user beforehand and stored in a server, and the individual information for identification 21 and the process profile information 22 can be engraved as a pattern information again after the scrap 13 is generated.

As explained above, by performing process for giving and inheriting of the individual information for identification 21 in either or both of the ingot melters and the ingot user, and by performing process for giving the process profile information 22 in the ingot user, properties and conditions of the titanium scrap 13 recycled to the ingot melters becomes obvious at the time of recovery by considering variation of composition depending on the process profile information in addition to the original composition, and when the ingot maker produces ingot using the scrap again as a raw material, analysis of composition can be omitted, and the production process can be efficiently attained.

II-2. Recycling Process of Scrap at the Ingot Melters

2-1) Preliminary Experiment to Assume Variation of Composition

Before explaining the third and fourth embodiment of the present invention, the preliminary experiment to assume variation of composition of the scrap 13 based on the process profile information 22 given by the ingot user, is explained.

In the process profile information 22 given to the scrap 13, profile of processing performed until the scrap 13 is generated (kind of treatment, condition, number of times or the like) and weight of the scrap that is processed, are included. By these information, the amount of oxygen and nitrogen pick-up can be estimated in the scrap 13 as follows.

A. Case of Gas Cutting

By setting following practical precedent conditions, the amount of oxygen pick-up $\Delta W_{ox}$ (ppm) and nitrogen pick-up $\Delta W_{ni}$ (ppm) after gas cutting of the scrap 13 can be estimated as follows.

A-1) Precedent Conditions

Weight of scrap to be cut by gas cutting: $W_S$ (kg)

Total area of gas cutting: S ($cm^2$)

Increasing amount of oxygen per unit area of gas cutting: $W_{ox\text{-}gas}$ ($g/cm^2$)

Increasing amount of nitrogen per unit area of gas cutting: $W_{ni\text{-}gas}$ ($g/cm^2$)

A-2) Increasing Amount of Oxygen and Nitrogen

By using the above precedent conditions, the amount of oxygen pick-up $\Delta W_{ox}$ (ppm) and nitrogen pick-up $\Delta W_{ni}$ (ppm) can be calculated as follows.

$$\Delta W_{ox} = W_{ox\text{-}gas} \cdot S/W_S \times 10^6 \quad (1)$$

$$\Delta W_{ni} = W_{ni\text{-}gas} \cdot S/W_S \times 10^6 \quad (2)$$

B. Case of Hot Rolling

By setting practical precedent conditions as similar to the case of gas cutting, the amount of oxygen pick-up $\Delta W_{ox}$ (ppm) and nitrogen pick-up $\Delta W_{ni}$ (ppm) after hot rolling of the scrap 13 can be estimated. In this case, it should be noted that the scrap 13 is called a slab since the scrap 13 becomes a slab in hot rolling.

B-1) Precedent Conditions

Weight of slab to be rolled by hot rolling: $W_S$ (kg)
Surface area of slab before hot rolling: $\Sigma S$ (cm$^2$)
Number of times of hot rolling: N (times)
Increasing amount of oxygen per hot rolling of one time and per unit surface area of slab: $W_{ox\text{-}rol}$ (g/cm$^2$·times)
Increasing amount of nitrogen per hot rolling of one time and per unit surface area of slab: $W_{ni\text{-}rol}$ (g/cm$^2$·times)

B-2) Increasing Amount of Oxygen and Nitrogen

By using the above precedent conditions, increasing the amount of oxygen pick-up $\Delta W_{ox}$ (ppm) and nitrogen pick-up $\Delta W_{ni}$ (ppm) can be calculated as follows.

$$\Delta W_{ox} = W_{ox\text{-}rol} \cdot \Sigma S \cdot N/W_S \times 10^6 \quad (3)$$

$$\Delta W_{ni} = W_{ni\text{-}rol} \cdot \Sigma S \cdot N/W_S \times 10^6 \quad (4)$$

C. Case of Hot Forging

As similar to the case of gas cutting, the amount of oxygen pick-up $\Delta W_{ox}$ (ppm) and nitrogen pick-up $\Delta W_{ni}$ (ppm) after hot forging of the scrap 13 can be estimated as follows.

C-1) Precedent Conditions

Weight of slab to be forged before hot forging: $W_S$ (kg)
Surface area of slab before hot forging: $\Sigma S$ (cm$^2$)
Number of times of hot forging: N (times)
Increasing amount of oxygen per hot forging of one time and per unit surface area of slab: $W_{ox\text{-}fog}$ (g/cm$^2$·times)
Increasing amount of nitrogen per hot forging of one time and per unit surface area of slab: $W_{ni\text{-}fog}$ (g/cm$^2$·times)

C-2) Oxygen Pick-Up and Nitrogen Pick-Up

By using the above precedent conditions, the amount of oxygen pick-up $\Delta W_{ox}$ (ppm) and nitrogen pick-up $\Delta W_{ni}$ (ppm) can be calculated as follows.

$$\Delta W_{ox} = W_{ox\text{-}fog} \cdot \Sigma S \cdot N/W_S \times 10^6 \quad (5)$$

$$\Delta W_{ni} = W_{ni\text{-}fog} \cdot \Sigma S \cdot N/W_S \times 10^6 \quad (6)$$

Coefficients of the amount of oxygen pick-up $\Delta W_{ox}$ (ppm) and nitrogen pick-up $\Delta W_{ni}$ (ppm) in gas cutting, hot rolling, or hot forging can be determined as a practical value by the preliminary experiment.

For example, in case that metal purchased and accepted at the ingot users have a circular pillar shape, it would be processed by all of the processes mentioned above. Therefore, in this case, the increasing portion of oxygen and nitrogen added to the titanium scrap is calculated by the increasing portion accompanied by the hot forging, hot rolling, and gas cutting.

On the other hand, in a case in which metal purchased and accepted at the ingot melters have a rectangular slab shape, the amount of oxygen pick-up and nitrogen pick-up to the original titanium scrap is calculated by the amount of oxygen pick-up and nitrogen pick-up accompanied only by the hot rolling and gas cutting among the processes.

By employing the calculating formula in the scrap treating process and combining information given to the scrap 13, the amount of oxygen pick-up and nitrogen pick-up to the original scrap which are brought in a smelting factory can be estimated every time without analyzing compositions of the scrap.

It is desirable that correspondence relationship of treatment method and variance of composition obtained by this preliminarily experiment (Table 1) be stored in a data server computer, explained later, so as to construct database.

2-2) Third Embodiment

Next, the third embodiment of the present invention in which ingot is produced by using recovered scrap is explained.

Figure 10A:
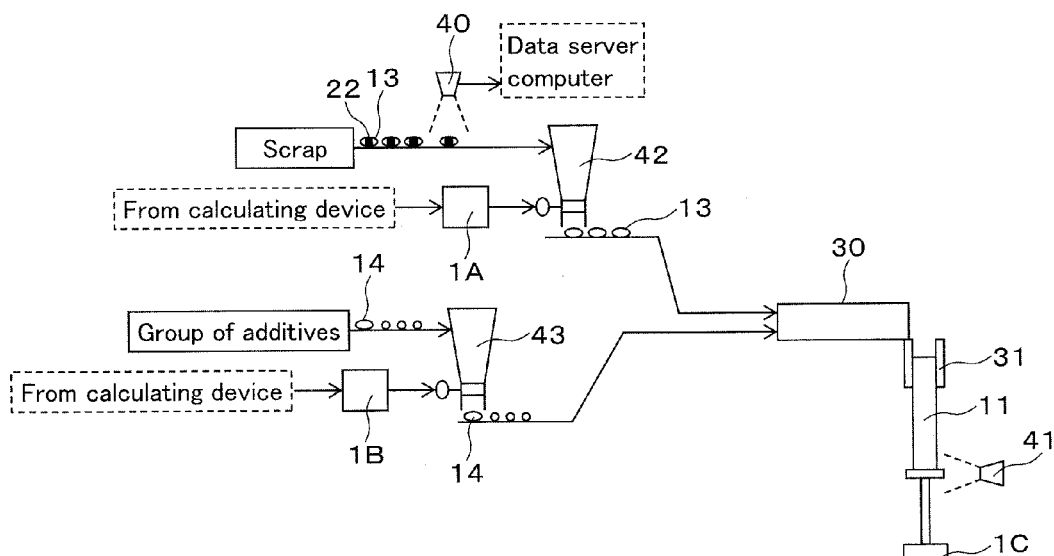
FIG. 10 is a diagram showing the third embodiment of a scrap recycling system of the present invention.
Figure 10B:
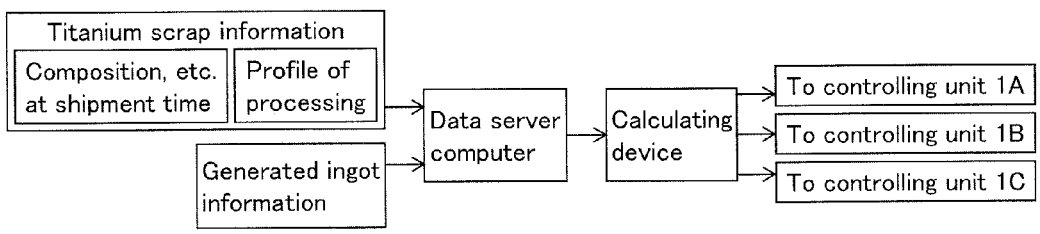

FIG. 10 shows a desirable example of a process after the titanium scrap 13, which is processed beforehand by inheriting and giving the individual information for identification and the process profile information as mentioned above, is recycled to the ingot melters. That is, as shown in FIG. 10A, the titanium scrap 13 to which the individual information for identification 21 and the processing profile information 22 are given is conveyed on a conveying line, and the individual information for identification 21 and the process profile information 22 given to the titanium scrap 13 are scanned by an automatic reading device 40 arranged at the middle of the conveyer line.

The individual information for identification 21 and the process profile information 22 which are scanned by the automatic reading device 40 are then transmitted to a data server. Database of chemical composition or the like regarding the individual information for identification is installed in the data server, and by verifying the individual information for identification 21 scanned and the database, information required such as original chemical composition or the like of the titanium scrap before shipped to the user can be read out. In addition, in the data server, since the database which shows relationship of kind of process and variance of composition obtained by the above-mentioned preliminarily experiment is also stored, by verifying the process profile information 22 scanned and the database, information of variance of composition by process profile of the scrap can also be read out.

Next, information of original chemical composition of the scrap and information of variance of composition read out are transmitted to a calculating device, they are added, and estimated value of chemical composition of the scrap of at the time is calculated. Furthermore, depending on this estimated value of chemical composition of at the time, the calculating device can determine the feeding rate of the scrap 13 required, and also kinds and feeding rate of additives 14, if necessary, stored in advance to satisfy information of a target ingot to be produced (chemical composition and producing rate).

As the additive 14, several additives are prepared such as Fe, Al, O, and N in high concentration, or an additive not containing alloy composition such as titanium sponge. These additives are separately fed according to a result of calculation by the calculating device.

Information of feeding rate of the titanium scrap 13, which has been calculated by the device, is transmitted from the calculating device to a controlling device 1A to control the feeding rate of the titanium scrap 13 filled in a feed hopper 42 of the titanium scrap 13. By controlling the feed hopper 42 by the controlling device 1A, the scrap 13 is fed at a rate according to a result of calculation. Similarly, information of kinds and feeding rate of additives 14 such as the material containing alloy composition or titanium sponge is transmitted to a controlling device 1B, by controlling a feeding hopper 43 by the controlling device 1B, the additive or additives 14 are fed at a rate corresponding to a result of the calculation.

In this way, the titanium scrap 13 and the additive or additives 14 are fed to a hearth 30, molten metal produced therein is poured into a mold 31, and the ingot 11 is produced by cooling and solidifying the molten metal. Furthermore, information of production rate of the ingot beforehand is transmitted to a controlling device 1C to control the extracting rate of the titanium ingot 11, and the ingot 11 is actually extracted at the predetermined extracting rate.

In FIG. 10, a feed system of additive 14 (additive 14, feed hopper 43, and controlling device 1B) is described representatively in one line; however, the feed system can be multiply arranged so as to supply multiple additives independently if necessary.

Furthermore, the scrap can be fed as it is without any treatment in the case that the individual information for identification 21 and the process profile information 22 are directly formed as an engraved marking on the scrap 13; however, if the individual information for identification 21 and the process profile information 22 are given by attaching the IC tag 20, the IC tag 20 should be appropriately detached from the scrap 13 in a removing process between the process in which the tag is scanned by the automatic reading device 40 and the process information regarding the scrap filled in the feeding hopper 42.

The specification and feed rates of the raw material required are obtained as follows by the calculating device. For example, in a case in which information of a target ingot (subscript: I), which should be input beforehand, is as follows:

Titanium concentration: $C_I^{Ti}$ (constant)
Oxygen concentration: $C_I^O$ (constant)
Nitrogen concentration: $C_I^N$ (constant)
Producing rate: $V_I$ (constant)

and information of a scrap (subscript: S) at the time, which is read and considered its variation of composition, is as follows:

Titanium concentration: $C_S^{Ti}$ (constant)
Oxygen concentration: $C_S^O$ (constant)
Nitrogen concentration: $C_S^N$ (constant)
Feed rate: $V_S$ (constant)

and information of additive of oxygen (subscript: A1, for example, titanium oxide) is as follows:

Titanium concentration: $C_{A1}^{Ti}$ (constant)
Oxygen concentration: $C_{A1}^O$ (constant)
Feed rate: $V_{A1}$ (constant)

and information of additive of nitrogen (subscript: A2, for example, titanium nitride) is as follows:

Titanium concentration: $C_{A2}^{Ti}$ (constant)
Nitrogen concentration: $C_{A2}^N$ (constant)
Feed rate: $V_{A2}$ (constant)

and information of titanium sponge (subscript: Ti) is as follows:

Titanium concentration: $C_{Ti}^{Ti}$ (constant)
Feed rate: $V_{Ti}$ (constant), then, the following formulas apply.

$$V_{Ti} \cdot C_{Ti}^{Ti} + V_{A1} \cdot C_{A1}^{Ti} + V_{A2} \cdot C_{A2}^{Ti} + V_S \cdot C_S^{Ti} = V_I \cdot C_I^{Ti} \quad \text{(equation regarding titanium weight)}$$

$$V_{A1} \cdot C_{A1}^O + V_S \cdot C_S^O = V_I \cdot C_I^O \quad \text{(equation regarding oxygen weight)}$$

$$V_{A2} \cdot C_{A2}^N + V_S \cdot C_S^N = V_I \cdot C_I^N \quad \text{(equation regarding nitrogen weight)}$$

Since the production rate $V_I$ and the titanium concentration $C_I^{Ti}$ of the target ingot, and the concentrations ($C_S^{Ti}$, $C_S^O$, $C_S^N$) in the scrap and the concentrations ($C_{A1}^{Ti}$, $C_{A1}^O$, $C_{A2}^{Ti}$, $C_{A2}^N$) in the additives are already known, by solving the equations simultaneously, feed rate of the scrap ($V_S$) and additives ($V_{A1}$, $V_{A2}$) can be determined appropriately.

When solving the equations, there may be a case in which a solution cannot be determined in one way depending on combination of materials. In such a case, feed rate of the titanium scrap 13 can be determined in priority to the others, or feed rate of the additive 14 can be determined in priority to the others. By selecting between these cases, a solution can be arbitrary obtained in one way. This case can be appropriately selected depending on the status of the stock of raw materials.

By installing the controlling logic above mentioned in the calculating device, feed rate of each additive can be controlled according to the feed rate of titanium scrap in the melting furnace.

Reference numeral 41 indicates a measuring device of the production rate of the ingot 11. During the ingot production process by the above mentioned controlling techniques, it detects actual feed rate of ingot produced at a rate in which accidental error of raw material supply or variance by evaporation of molten metal or the like are considered, feeds back this detection result to the calculating device, and thus contributes to controlling of feed rate of the raw material and extracting rate of the ingot 11.

By installing the system as above mentioned, an ingot having a target composition can be efficiently produced.

2-3) Fourth Embodiment

Figure 11A:
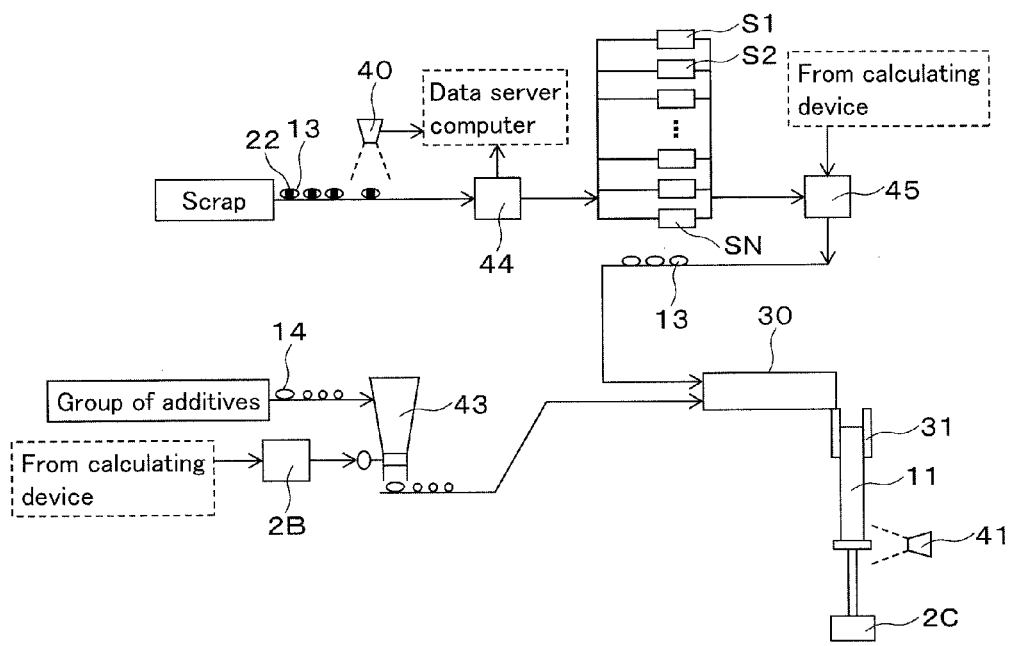
FIG. 11 is a diagram showing the fourth embodiment of scrap recycling system of the present invention.
Figure 11B:
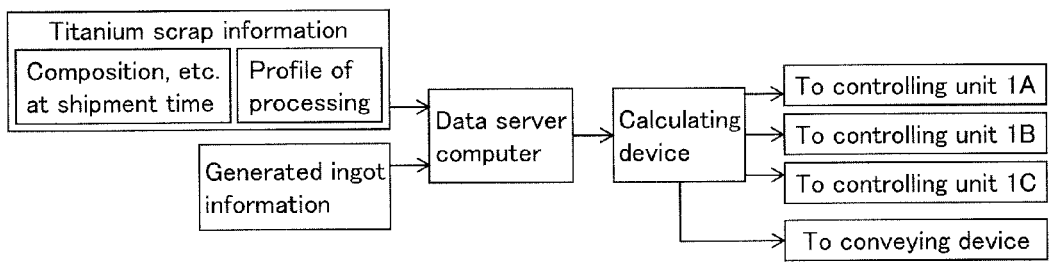

FIG. 11 shows another desirable embodiment of the present invention.

In this embodiment, different from the case of the third embodiment, the titanium scrap 13 in which the individual identification information 21 and the process profile information 22 are scanned at the automatic reading device 40 is once stored in a raw material storage S via a conveyer device 44. This process is repeated in each scrap of multiple kinds, and each of them is separately stored in storage S1, S2, . . . SN.

In this time, in addition to storing each scrap in the corresponding storage, each individual information for identification 21 and process profile information 22 which are scanned by the automatic reading device 40 is transmitted to the data server, and information of number of storage (S1, S2, . . . SN) for each scrap is also stored in the data server by being added to the individual information for identification 21 and the process profile information 22.

Subsequently, similar to the first embodiment, composition and production rate of a target ingot are inputted, and according to this, estimated value of composition at the present process profile of the scrap is calculated first, and then, kinds and feed rate of the scrap and kinds and feed rate of the additives to be supplied are obtained from the calculating device. The result of calculation is transmitted to a conveyer device 45, then desirable titanium scrap is automatically selected from the storage appropriately, and specific titanium scrap and an additive or additives can be fed to the melting hearth.

Also in this embodiment, similar to the first embodiment, there is a case in which solutions of simultaneous equations of chemical composition concentration and feed rate are not determined in one way; however, also in this case, by determining kind and feed rate of a scrap to be used preferentially among the scraps stored in the storage, a variable number regarding other scraps and additives can be determined.

According to the above aspect, compared to the first embodiment, more variable ingots having wide specifications can be produced.

2-4) Other Modifications

In the present invention, as is explained above, the individual identification information 21 and the process profile information 22 can be separately stored in the server so as to install the database; however, as another embodiment, at the time the process profile information 22 is scanned, variation of composition can be added to the individual identification information 21, so that they are combined and constructed as a database of the individual information for identification 21.

As the titanium scrap used in the present invention, titanium turning chips, titanium chips, or titanium crops can be appropriately used. The titanium crop mentioned here indicates titanium block having thickness to some extent that is generated in rolling process of titanium ingot, that is, cuboid titanium scrap. The titanium crop having such a shape can be appropriately melted by using an electron beam melting furnace having a conveyer device of a cuboid shape.

Furthermore, it is desirable that an elemental metal selected from Ti, Fe, Al, V, Sn, Si or an alloy or oxide containing one or more selected from Ti, Fe, Al, V, Sn, Si, O, or N be used as the additive of the present invention.

In practice, the additive of the invention includes not only an oxygen source to be added to pure titanium such as titanium oxide and iron oxide, but also titanium sponge. The titanium sponge can be an effective additive in a case in which there is too little titanium scrap to satisfy production amounts of titanium ingot required, or in a case in which it is necessary to satisfy required properties of titanium ingot produced.

By appropriately selecting and combining these elements, titanium ingots having wide specifications can be produced.

In the present invention, it is desirable that the IC tag to record the individual identification information and the processing profile information given to the titanium scrap be as fine as possible. As a result, even in a case in which the titanium scrap is melted without removing the IC tag beforehand, contamination of the titanium ingot produced can be reduced to a minimal level.

If quality and properties required for the ingot are stringent, by recording the individual identification information and the processing profile information in the titanium scrap itself by a method such as laser engraving, contamination accompanied by melting the IC tag can be avoided.

EXAMPLES

The present invention is explained further by way of Examples and Comparative Examples as follows.

Using titanium scrap to which the individual identification information is given, titanium ingot was produced in an electron beam melting furnace.
1. Raw Material for Melting
  1) Titanium scrap: Titanium crop
  2) Additives
    Titanium source: Titanium sponge
    Oxygen source: Powder titanium oxide
2. Recording Medium for Individual Identification Information
  1) An IC tag containing the information is attached on the titanium crop surface in a case in which composition of an original ingot is inherited to chemical composition of titanium crop.
  2) Content ratio of oxygen and nitrogen in chemical composition at present of the titanium crop was calculated based on processing profile of the titanium crop and using equations (1) to (6) mentioned above, and it is added to the composition of original titanium ingot, and then stored in the IC tag.
3. Melting Furnace
  1) Electron beam melting furnace with hearth: Output 400 kW
  2) Diameter of mold: 100 mm
4. Evaluation of Ingot The ingot produced was hot-forged to process to a billet, and then processed to a sheet having a thickness of 1 mm. Existence of LDI (low density inclusions) and segregation situation of oxygen and iron in the sheet titanium material were researched by transmission type X-ray, EPMA and optical microscope.

Examples of the case in which composition of an original ingot is inherited in the chemical composition of a titanium crop are shown as Examples 1 to 5 and Comparative Example 1.

Example 1

Apparatus and controlling system shown in FIG. 5 were used, and block shape titanium crop was used as titanium scrap, so as to produce a titanium ingot. Analyzed value of oxygen, nitrogen, and iron in the produced titanium ingot was obtained by the above-mentioned method, and the conditions of distribution at top, middle, and bottom of the ingot was investigated using EPMA.

The results of research are shown in Table 1. As shown in Table 1, segregation of concentration of iron, oxygen, and nitrogen in the ingot produced was slight. Furthermore, there was no LDI observed in the ingot produced.

TABLE 1

| | Top | Middle | Bottom | Note |
|---|---|---|---|---|
| | | | | Unit: wt % |
| Fe | 0.043 | 0.042 | 0.042 | LDI not observed |
| O | 0.094 | 0.095 | 0.096 | LDI not observed |
| N | 0.002 | 0.002 | 0.002 | LDI not observed |

Example 2

Apparatus and controlling system shown in FIG. 5 were used, and block shape titanium batch was used as titanium scrap, so as to produce a titanium ingot. As similar as above, quality of ingot was evaluated. The results are shown in Table 2.

TABLE 2

| | Top | Middle | Bottom | Note |
|---|---|---|---|---|
| | | | | Unit: wt % |
| Fe | 0.044 | 0.044 | 0.043 | LDI not observed |
| O | 0.090 | 0.092 | 0.093 | LDI not observed |
| N | 0.002 | 0.002 | 0.002 | LDI not observed |

Example 3

Except that the individual identification information was given by digital mark formed on the titanium crop surface by laser instead of the IC tag, a titanium ingot was produced and quality was investigated in a manner similar to that of Example 1. The results are shown in Table 3.

As shown in Table 3, not only was the LDI not detected in the ingot produced, but also iron, oxygen and nitrogen were distributed uniformly.

TABLE 3

|  | Top | Middle | Bottom | Note |
|---|---|---|---|---|
|  |  |  |  | Unit: wt % |
| Fe | 0.043 | 0.041 | 0.043 | LDI not observed |
| O | 0.091 | 0.092 | 0.090 | LDI not observed |
| N | 0.002 | 0.001 | 0.002 | LDI not observed |

Example 4

Except that powdered iron oxide was used as an additive, titanium ingot was produced in a manner similar to that of Example 1. As shown in Table 4, iron, oxygen and nitrogen were distributed uniformly in the titanium ingot produced.

TABLE 4

|  | Top | Middle | Bottom | Note |
|---|---|---|---|---|
|  |  |  |  | Unit: wt % |
| Fe | 0.041 | 0.041 | 0.040 | LDI not observed |
| O | 0.089 | 0.090 | 0.090 | LDI not observed |
| N | 0.002 | 0.002 | 0.002 | LDI not observed |

Example 5

Except that Al—V alloy was used as an additive, 6Al-4V alloy was produced in a manner similar to that of Example 1. Situation of distribution of Al and V in the ingot produced was analyzed, and the results are shown in Table 5.

TABLE 5

|  | Top | Middle | Bottom | Note |
|---|---|---|---|---|
|  |  |  |  | Unit: wt % |
| Al | 6.15 | 6.18 | 6.15 | LDI not observed |
| V | 3.92 | 3.92 | 3.93 | LDI not observed |
| O | 0.121 | 0.125 | 0.120 | LDI not observed |
| N | 0.002 | 0.003 | 0.003 | LDI not observed |

Comparative Example 1

Titanium ingot was produced in a manner similar to that of Example 1, except that recycled material of titanium scrap to which the individual identification information was not given. In this Comparative Example 1, oxygen and nitrogen contained in the scrap are analyzed, and weight of each of the scraps was weighed. Based on the measured values, an average value of oxygen and nitrogen of the titanium scrap used in melting was determined, and this value is used as the representative value of whole titanium scrap. Furthermore, the titanium scraps were melt-cut so that each piece of scrap had almost same weight.

After these steps, titanium ingot was produced using the electron beam melting furnace. Composition of the titanium ingot produced was shown in Table 6. The ingot produced had almost the same composition as the ingot of Example 1 as a whole, and there was no segregation of oxygen and nitrogen in the ingot, and thus the ingot having uniform composition was produced. However, compared to Example 1, several kinds of steps were necessary until the melting operation, and thus productivity of the ingot was 5% deteriorated compared to Example 1 of the present invention.

TABLE 6

|  | Top | Middle | Bottom | Note |
|---|---|---|---|---|
|  |  |  |  | Unit: wt % |
| Fe | 0.035 | 0.045 | 0.030 | LDI not observed |
| O | 0.094 | 0.075 | 0.100 | LDI not observed |
| N | 0.003 | 0.001 | 0.003 | LDI not observed |

Examples of the case in which chemical composition of titanium crop is influenced by processing profile of the titanium crop are shown as Examples 6 to 10 and Comparative Example 2.

Example 6

Apparatus and controlling system shown in FIG. 10 were used, and block shape titanium crop was used as titanium scrap, so as to produce titanium ingot. Analyzed value of oxygen, nitrogen, and iron in the produced titanium ingot was obtained by the above-mentioned method, and situation of distribution at top, middle, and bottom of the ingot was researched by EPMA.

The results of research are shown in Table 7. As shown in Table 7, segregation of iron, oxygen, and nitrogen in the ingot produced was slight. Furthermore, there was no LDI observed in the ingot produced.

TABLE 7

|  | Top | Middle | Bottom | Note |
|---|---|---|---|---|
|  |  |  |  | Unit: wt % |
| Fe | 0.040 | 0.039 | 0.039 | LDI not observed |
| O | 0.095 | 0.096 | 0.096 | LDI not observed |
| N | 0.002 | 0.002 | 0.002 | LDI not observed |

Example 7

Apparatus and controlling system shown in FIG. 10 were used, and block shape titanium crop was used as titanium scrap, so as to produce titanium ingot. Quality of the ingot produced was evaluated in a manner similar to that of the above Example. The results of research are shown in Table 8.

Here, based on the processing profile of the titanium crop recorded, using the equations (1) to (6), and calculation was performed by adding oxygen content ratio and nitrogen content ratio of the titanium crop to the composition of the original ingot.

TABLE 8

| | Top | Middle | Bottom | Note | Unit: wt % |
|---|---|---|---|---|---|
| Fe | 0.042 | 0.041 | 0.042 | LDI not observed | |
| O | 0.094 | 0.094 | 0.095 | LDI not observed | |
| N | 0.002 | 0.002 | 0.002 | LDI not observed | |

Example 8

Except that the individual identification information was given by digital mark formed on the titanium crop surface by laser instead of the IC tag, titanium ingot was produced and quality was researched in a manner similar to that of Example 6. The results are shown in Table 9.

Here, based on the processing profile of the titanium crop recorded, using the equations (1) to (6), and calculation was performed by adding oxygen content ratio and nitrogen content ratio of the titanium crop to the composition of the original ingot.

As shown in Table 9, not only was the LDI not detected in the ingot produced, but also iron, oxygen and nitrogen were distributed uniformly.

TABLE 9

| | Top | Middle | Bottom | Note | Unit: wt % |
|---|---|---|---|---|---|
| Fe | 0.045 | 0.044 | 0.044 | LDI not observed | |
| O | 0.094 | 0.095 | 0.095 | LDI not observed | |
| N | 0.002 | 0.002 | 0.002 | LDI not observed | |

Example 9

Except that powder shape iron oxide was used as an additive, titanium ingot was produced in a manner similar to that of Example 6. As shown in Table 10, iron, oxygen and nitrogen were distributed uniformly in the titanium ingot produced.

TABLE 10

| | Top | Middle | Bottom | Note | Unit: wt % |
|---|---|---|---|---|---|
| Fe | 0.041 | 0.040 | 0.040 | LDI not observed | |
| O | 0.093 | 0.094 | 0.094 | LDI not observed | |
| N | 0.001 | 0.001 | 0.001 | LDI not observed | |

Example 10

Except that Al—V alloy was used as an additive, 6Al-4V alloy was produced in a manner similar to that of Example 6. Situation of distribution of Al and V in the ingot produced was analyzed, and the results are shown in Table 11.

TABLE 11

| | Top | Middle | Bottom | Note | Unit: wt % |
|---|---|---|---|---|---|
| Al | 6.20 | 6.21 | 6.21 | LDI not observed | |
| V | 3.91 | 3.91 | 3.92 | LDI not observed | |
| O | 0.125 | 0.127 | 0.130 | LDI not observed | |
| N | 0.002 | 0.002 | 0.002 | LDI not observed | |

Comparative Example 2

Titanium ingot was produced in a manner similar to that of Example 6, except that recycled material of titanium scrap not including the individual identification information was used. In this Comparative Example 2, oxygen and nitrogen contained in the scrap are analyzed, and weight of each of the scraps was weighed. Based on the measured values, an average value of oxygen and nitrogen of the titanium scrap used in melting was determined, and this value is used as the representative value of whole titanium scrap. Furthermore, the titanium scraps were melt-cut so that each scrap had almost the same weight.

After these steps, titanium ingot was produced using the electron beam melting furnace. Composition of the titanium ingot produced is shown in Table 12. The ingot produced had almost the same composition as the ingot of Example 6 as a whole, and there was no segregation of oxygen and nitrogen in the ingot, and thus the ingot having uniform composition was produced. However, compared to Example 1, several kinds of steps were necessary until the melting operation, and thus productivity of the ingot was 5.9% reduced compared to Example 6 of the present invention.

TABLE 12

| | Top | Middle | Bottom | Note | Unit: wt % |
|---|---|---|---|---|---|
| Fe | 0.040 | 0.036 | 0.045 | LDI not observed | |
| O | 0.098 | 0.108 | 0.095 | LDI not observed | |
| N | 0.002 | 0.002 | 0.002 | LDI not observed | |

The present invention hopes to contribute to improvement of efficiency of production process for titanium alloy ingots.

EXPLANATION OF REFERENCE NUMERALS

10: Raw material, 11: ingot, 12: product, 13: scrap, 20: IC tag, 21: individual identification information, 21a: individual identification information inherited, 22: processing profile information, 30: hearth, 31: mold, 40: automatic reading device, 41: detecting device, 42, 43: feed hopper, 44: reading device, 45: writing device, 50: composition varied part (oxide/nitride), 1A to 1C: controlling device, 2A to 2C: controlling device, and S1 to SN: storage.

The invention claimed is:

1. A method for production of titanium ingot in which titanium scrap is partially employed as a raw materials of the titanium ingot, the method comprising steps of:
   inputting into a data server a chemical composition of an ingot to be produced and a production rate of the ingot to be produced;
   providing at least one additive to at least one additive feed hopper, the at least one additive feed hopper having a controlling device controlling a rate at which the at least one additive is supplied to a hearth;
   obtaining individual information for identification by passing at least one kind of titanium scrap having individual information for identification through automatic reading means, the individual information for identification comprising information indicative of a chemical composition of the at least one kind of titanium scrap;
   transmitting the obtained individual information for identification to the data server and then storing therein;
   providing the at least one kind of titanium scrap to at least one titanium scrap storage, the at least one titanium scrap storage having a controlling device controlling a rate at which the at least one kind of titanium scrap is supplied to the hearth;

obtaining from the data server a chemical composition of the at least one kind of titanium scrap based on the obtained individual information for identification;

transmitting from the data server to a calculating means the chemical composition of the at least one kind of titanium scrap and the chemical composition of the ingot to be produced;

providing the calculating means a chemical composition of the at least one additive;

calculating with the calculating means the rate at which the at least one additive is supplied to the hearth and the rate at which the at least one kind of titanium scrap is supplied to the hearth to satisfy the chemical composition of the ingot to be produced and the production rate of the ingot to be produced by using the chemical composition of the at least one kind of titanium scrap, the chemical composition of the at least one additive, the production rate of the ingot to be produced and the chemical composition of the ingot to be produced;

transmitting electrical signals corresponding to the calculated rate at which the at least one additive is supplied to the hearth from the calculating means to the controlling device controlling the rate which the at least one additive is supplied to the hearth and then starting supply thereof at said rate;

transmitting electrical signals corresponding to the calculated rate at which the at least one kind of titanium scrap is supplied to the hearth from the calculating means to the controlling device controlling the rate which the at least one kind of titanium scrap is supplied to the hearth and then starting supply thereof at said rate;

starting production of the ingot to be produced by transferring a molten metal produced in the hearth from the at least one kind of titanium scrap and the at least one additive from the hearth to a mold and extracting from the mold the ingot to be produced;

reading a producing rate of the ingot to be produced by detecting means equipped at an extracting part of the mold, after starting production of the ingot to be produced.

2. A method for production of titanium ingot in which titanium scrap is employed as a portion of raw materials of the titanium ingot, the method comprising steps of:

inputting into a data server a chemical composition of an ingot to be produced and a production rate of the ingot to be produced;

providing at least one additive to at least one additive feed hopper, the at least one additive feed hopper having a controlling device controlling a rate at which the at least one additive is supplied to a hearth;

obtaining individual information for identification and including process profile information by passing at least one kind of titanium scrap having individual information for identification and process profile information through automatic reading means, the individual information for identification comprising information indicative of a chemical composition of the at least one kind of titanium scrap, the process profile information comprising information indicative of the processing performed to generate the at least one kind of titanium scrap;

transmitting the obtained individual information for identification and process profile information to the data server and then storing therein;

providing the at least one kind of titanium scrap to at least one titanium scrap storage, the at least one titanium scrap storage having a controlling device controlling a rate at which the at least one kind of titanium scrap is supplied to the hearth;

obtaining from the data server a chemical composition of the at least one kind of titanium scrap based on the obtained individual information for identification;

obtaining from the data server a variance of composition of the at least one kind of titanium scrap based on the obtained process profile information, the variance of composition comprising a change in chemical composition with respect to the chemical composition indicated by the individual information for identification;

transmitting from the data server to a calculating means the chemical composition of the at least one kind of titanium scrap, the variance of composition of the at least one kind of titanium scrap and the chemical composition of the ingot to be produced;

providing the calculating means a stored chemical composition of the at least one additive;

estimating with the calculating means an estimated chemical composition of the at least one kind of titanium scrap by using the chemical composition of the at least one kind of titanium scrap and the variance of composition of the at least one kind of titanium scrap;

calculating with the calculating means the rate at which the at least one additive is supplied to the hearth and the rate at which the least one kind of titanium scrap is supplied to the hearth to satisfy the chemical composition of the ingot to be produced and the production rate of the ingot to be produced by using the estimated chemical composition of the at least one kind of titanium scrap, the chemical composition of the at least one additive, the production rate of the ingot to be produced and the chemical composition of the ingot to be produced;

transmitting electrical signals corresponding to the calculated rate at which the at least one additive is supplied to the hearth from the calculating means to the controlling device controlling the rate which the at least one additive is supplied to the hearth and then starting supply thereof at said rate;

transmitting electrical signals corresponding to the calculated rate at which the at least one kind of titanium scrap is supplied to the hearth from the calculating means to the controlling device controlling the rate which the at least one kind of titanium scrap is supplied to the hearth and then starting supply thereof at said rate;

starting production of the ingot to be produced by transferring a molten metal produced in the hearth from the at least one kind of titanium scrap and the at least one additive from the hearth to a mold and extracting from the mold the ingot to be produced;

reading a producing rate of the ingot to be produced by a detecting means equipped at an extracting part of the mold, after starting production of the ingot to be produced.

3. The method for production of titanium ingot according to claim 1, wherein the individual information for identification comprises at least one of a mark engraved directly on a surface of the at least one kind of titanium scrap, a two-dimensional figure directly engraved on a surface of the at least one kind of the titanium scrap, and an IC chip attached to the at least one kind of titanium scrap.

4. The method for production of titanium ingot according to claim 2,
wherein the individual information for identification comprises at least one of a mark engraved directly on a surface of the at least one kind of titanium scrap, a two-dimensional figure engraved directly on a surface of the at least one kind of the titanium scrap and an IC chip attached to the at least one kind of titanium scrap; and
wherein the process profile information comprises at least one of a mark engraved directly on a surface of the at least one kind of titanium scrap, a two-dimensional figure engraved directly on a surface of the at least one kind of the titanium scrap and an IC chip attached to the at least one kind of titanium scrap.

5. The method for production of titanium ingot according to claim 3,
wherein the individual information for identification comprises a two-dimensional figure engraved on a surface of the at least one kind of the titanium scrap, the two-dimensional figure comprising at least one of a digital code, a QR code, a barcode and a character.

6. The method for production of titanium ingot according to claim 1,
wherein the individual information for identification comprises at least one of chemical composition and weight.

7. The method for production of titanium ingot according to claim 1,
wherein the individual information for identification comprises a marking inherited from a titanium ingot from which the at least one kind of titanium scrap is derived.

8. The method for production of titanium ingot according to claim 1,
wherein the individual information for identification comprises a piece of information provided by the ingot user and recorded on the at least one kind of titanium scrap.

9. The method for production of titanium ingot according to claim 1,
wherein the at least one kind of titanium scrap comprises a plurality of titanium scrap having mutually different individual information for identification,
wherein the at least one titanium scrap storage comprises a plurality of titanium scrap storage storing titanium scrap having mutually different individual information for identification, and
wherein the calculated rate at which the at least one kind of titanium scrap is supplied to the hearth comprises the rate at which each of the plurality of titanium scrap having mutually different information for identification is supplied to the hearth.

10. The method for production of titanium ingot according to claim 1,
wherein the at least one additive comprises at least one of Ti, Fe, Al, V, Sn, Si, O and N.

11. The method for production of titanium ingot according to claim 1,
wherein the at least one kind of titanium scrap having the individual information for identification is melted as it is.

12. The method for production of titanium ingot according to claim 1,
wherein the at least one kind of titanium scrap comprises at least one of commercial pure titanium and titanium alloy.

13. The method for production of titanium ingot according to claim 4,
wherein the individual information for identification comprises a two-dimensional figure comprising an image pattern comprising at least one of a digital code, a QR code, a barcode and a character.

14. The method for production of titanium ingot according to claim 2,
wherein the individual information for identification comprises a marking inherited from a titanium ingot from which the at least one kind titanium scrap is derived.

15. The method for production of titanium ingot according to claim 2,
wherein the individual information for identification comprises a piece of information provided by the ingot user and recorded on the at least one kind of titanium.

16. The method for production of titanium ingot according to claim 2,
wherein the at least one kind of titanium scrap comprises a plurality of titanium scrap having mutually different individual information for identification,
wherein the at least titanium scrap storage comprises a plurality of titanium scrap storage storing titanium scrap having mutually different individual information for identification, and
wherein the calculated rate at which the at least one kind of titanium scrap is supplied to the hearth comprises the rate at which each of the plurality of titanium scrap having mutually different information for identification is supplied to the hearth.

17. The method for production of titanium ingot according to claim 2,
wherein the at least one additive comprises at least one of Ti, Fe, Al, V, Sn, Si, O and N.

18. The method for production of titanium ingot according to claim 2,
wherein the at least one kind of titanium scrap having the individual information for identification is melted as it is.

19. The method for production of titanium ingot according to claim 2,
wherein the at least one kind of titanium scrap comprises at least one of commercial pure titanium and titanium alloy.

* * * * *